(12) United States Patent
Boyle et al.

(10) Patent No.: US 8,255,633 B2
(45) Date of Patent: Aug. 28, 2012

(54) LIST BASED PREFETCH

(75) Inventors: Peter Boyle, Edinburgh (GB); Norman Christ, Irvington, NY (US); Alan Gara, Yorktown Heights, NY (US); Changhoan Kim, San Jose, CA (US); Robert Mawhinney, New York, NY (US); Martin Ohmacht, Yorktown Heights, NY (US); Krishnan Sugavanam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 12/696,825

(22) Filed: Jan. 29, 2010

(65) Prior Publication Data

US 2011/0119426 A1    May 19, 2011

Related U.S. Application Data

(60) Provisional application No. 61/293,552, filed on Jan. 8, 2010, provisional application No. 61/261,269, filed on Nov. 13, 2009, provisional application No. 61/293,611, filed on Jan. 8, 2010, provisional application No. 61/295,669, filed on Jan. 15, 2010.

(51) Int. Cl.
*G06F 12/00* (2006.01)
*G06F 12/08* (2006.01)
(52) U.S. Cl. ............ 711/137; 711/3; 711/135; 711/141; 711/E12.001; 711/E12.017; 711/E12.026
(58) Field of Classification Search .................. 711/137, 711/3, 135, 141, E12.001, E12.017, E12.026
See application file for complete search history.

(56) References Cited

U.S. PATENT DOCUMENTS

| 5,666,514 | A | * | 9/1997 | Cheriton | 711/144 |
| 6,047,363 | A | * | 4/2000 | Lewchuk | 711/213 |

* cited by examiner

*Primary Examiner* — Yong Choe
(74) *Attorney, Agent, or Firm* — Scully, Scott, Murphy & Presser, P.C.; Daniel P. Morris, Esq.

(57) ABSTRACT

A list prefetch engine improves a performance of a parallel computing system. The list prefetch engine receives a current cache miss address. The list prefetch engine evaluates whether the current cache miss address is valid. If the current cache miss address is valid, the list prefetch engine compares the current cache miss address and a list address. A list address represents an address in a list. A list describes an arbitrary sequence of prior cache miss addresses. The prefetch engine prefetches data according to the list, if there is a match between the current cache miss address and the list address.

24 Claims, 2 Drawing Sheets

LIST BASED PREFETCH

CROSS-REFERENCE TO RELATED APPLICATIONS

This application claims the benefit of U.S. patent application Ser. Nos. 61/293,552, filed Jan. 8, 2010, for "LIST BASED PREFETCH"; 61/261,269, filed Nov. 13, 2009 for "LOCAL ROLLBACK FOR FAULT-TOLERANCE IN PARALLEL COMPUTING SYSTEMS"; 61/293,611, filed Jan. 8, 2010 for "A MULTI-PETASCALE HIGHLY EFFICIENT PARALLEL SUPERCOMPUTER"; and 61/295,669, filed Jan. 15, 2010 for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT", the entire content and disclosure of each of which is incorporated herein by reference; and is related to the following commonly-owned, co-pending United States Patent Applications, the entire contents and disclosure of each of which is expressly incorporated by reference herein as if fully set forth herein: U.S. patent application Ser. No. 12/684,367, filed Jan. 8, 2010, for "USING DMA FOR COPYING PERFORMANCE COUNTER DATA TO MEMORY"; U.S. patent application Ser. No. 12/684,172, filed Jan. 8, 2010 for "HARDWARE SUPPORT FOR COLLECTING PERFORMANCE COUNTERS DIRECTLY TO MEMORY"; U.S. patent application Ser. No. 12/684,190, filed Jan. 8, 2010 for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010 for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799, for "CONDITIONAL LOAD AND STORE IN A SHARED CACHE"; U.S. patent application Ser. No. 12/684,738, filed Jan. 8, 2010, for "DISTRIBUTED PERFORMANCE COUNTERS"; U.S. patent application Ser. No. 12/684,860, filed Jan. 8, 2010, for "PAUSE PROCESSOR HARDWARE THREAD ON PIN"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed Jan. 8, 2010, for "ZONE ROUTING IN A TORUS NETWORK"; U.S. patent application Ser. No. 12/684,852, filed Jan. 8, 2010, for "PROCESSOR RESUME UNIT"; U.S. patent application Ser. No. 12/684,642, filed Jan. 8, 2010, for "TLB EXCLUSION RANGE"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 61/293,237, filed Jan. 8, 2010, for "ORDERING OF GUARDED AND UNGUARDED STORES FOR NO-SYNC I/O"; U.S. patent application Ser. No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "Support for non-locking parallel reception of packets belonging to the same reception FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No. 12/984,252, for "SPECULATION AND TRANSACTION IN A SYSTEM SPECULATION AND TRANSACTION SUPPORT IN L2L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 13/008,502, for "MEMORY SPECULATION IN A MULTI LEVEL CACHE SYSTEM"; U.S. patent application Ser. No. 13/008,583, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 12/984,308, for "MINIMAL FIRST LEVEL CACHE SUPPORT FOR MEMORY SPECULATION MANAGED BY LOWER LEVEL CACHE"; U.S. patent application Ser. No. 12/984,329, for "PHYSICAL ADDRESS ALIASING TO SUPPORT MULTI-VERSIONING IN A SPECULATION-UNAWARE CACHE"; U.S. patent application Ser. No. 12/684,693, filed Jan. 8, 2010, for "PROGRAMMABLE STREAM PREFETCH WITH RESOURCE OPTIMIZATION"; U.S. patent application Ser. No. 61/293,494, filed Jan. 8, 2010, for "NON-VOLATILE MEMORY FOR CHECKPOINT STORAGE"; U.S. patent application Ser. No. 61/293,476, filed Jan. 8, 2010, for "NETWORK SUPPORT FOR SYSTEM INITIATED CHECKPOINTS"; U.S. patent application Ser. No. 61/293,554, filed Jan. 8, 2010, for "TWO DIFFERENT PREFETCHING COMPLEMENTARY ENGINES OPERATING SIMULTANEOUSLY"; U.S. patent application Ser. No. 12/697,015, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 61/293,569, filed Jan. 8, 2010, for "IMPROVING THE EFFICIENCY OF STATIC CORE TURNOFF IN A SYSTEM-ON-A-CHIP WITH VARIATION"; U.S. patent application Ser. No. 12/697,043, for "IMPLEMENTING ASYNCHRONOUS COLLECTIVE OPERATIONS IN A MULTI-NODE PROCESSING SYSTEM"; U.S. patent application Ser. No. 13/008,546, for "MULTIFUNCTIONING CACHE"; U.S. patent application Ser. No. 12/697,175 for "I/O ROUTING IN A MULTIDIMENSIONAL TORUS NETWORK"; U.S. patent application Ser. No. 12/684,287, filed Jan. 8, 2010 for "ARBITRATION IN CROSSBAR INTERCONNECT FOR LOW LATENCY"; U.S. patent application Ser. No. 12/684,630, filed Jan. 8, 2010 for "EAGER PROTOCOL ON A CACHE PIPELINE DATAFLOW"; U.S. patent application Ser. No. 12/723,277 for "EMBEDDING GLOBAL BARRIER AND COLLECTIVE IN A TORUS NETWORK"; U.S. patent application Ser. No. 61/293,499, filed Jan. 8, 2010 for "GLOBAL SYNCHRONIZATION OF PARALLEL PROCES- SORS USING CLOCK PULSE WIDTH MODULATION"; U.S. patent application Ser. No. 61/293,266, filed Jan. 8, 2010 for "IMPLEMENTATION OF MSYNC"; U.S. patent application Ser. No. 12/796,389 for "NON-STANDARD FLAVORS OF MSYNC"; U.S. patent application Ser. No. 12/696,817 for "HEAP/STACK GUARD PAGES USING A WAKEUP UNIT"; U.S. patent application Ser. No. 61/293,603, filed Jan. 8, 2010 for "MECHANISM OF SUPPORTING SUB-COMMUNICATOR COLLECTIVES WITH O(64) COUNTERS AS OPPOSED TO ONE COUNTER FOR EACH SUB-COMMUNICATOR"; and U.S. patent application Ser. No. 12/774,475 for "REPRODUCIBILITY IN A MULTIPROCESSOR SYSTEM".

GOVERNMENT CONTRACT

This invention was Government supported under Contract No. B554331 awarded by Department of Energy. The Government has certain rights in this invention.

BACKGROUND

The present application generally relates to a parallel computing system. More particularly, the present application relates to prefetching data to improve a performance of the parallel computing system.

Prefetching refers to a technique used in a processor to improve processor speed. Traditionally, prefetching places data in a cache memory before the data is needed. Thus, when the data is needed, the data can be provided to the processor more quickly because the data already resides in the cache memory before being requested.

Traditionally, prefetching data into a cache memory device is a standard method used in processor units to increase performance through a reduction of an average latency for a memory access instruction (e.g., load instruction, etc.). Typically, in a parallel computing system (e.g., IBM® Blue Gene®\L, or Blue Gene®\P, etc.), a prefetch engine (i.e., a hardware module performing the prefetching) prefetches a fixed number of data stream with a fixed depth (i.e., a certain number of instructions or a certain amount data to be fetched ahead).

The present application discloses improving a performance of a parallel computing system, e.g., by prefetching data or instructions according to a list including a sequence of prior cache miss addresses (i.e., addresses that caused cache misses before).

SUMMARY OF THE INVENTION

The present disclosure describes a system, method and computer program product for improving a performance of a parallel computing system, e.g., by prefetching data or instructions according to a list including a sequence of prior cache miss addresses.

In one embodiment, there may be provided a method for increasing performance in a parallel computing system, the method comprising:

receiving a current cache miss address, a cache miss address representing an address that caused a cache miss;

evaluating whether the current cache miss address is valid, a valid cache miss address referring to a cache miss address belonging to a class of cache miss addresses for which a list prefetching is intended;

comparing the cache miss address and a list address in response to determining that the current cache miss address is valid, the list address representing an address in a list, the list describing prior cache miss addresses; and prefetching data according to the list whose addresses appear later in the list in response to determining that there is a match between the current cache miss address and a list address.

In one embodiment, there may be provided a system for increasing performance in a parallel computing system, the method comprising:

a first module for receiving a current cache miss address, a cache miss address representing an address that caused a cache miss and evaluating whether the current cache miss address is valid, a valid cache miss address referring to a cache miss address belonging to a class of cache miss addresses for which a list prefetching is intended;

a first comparator for comparing the current cache miss address and a list address in response to determining that the current cache miss address is valid, the list address representing an address in a list, the list describing an arbitrary sequence of prior cache miss addresses; and a prefetch unit prefetching data whose addresses appear in the list in response to determining that there is a match between the current cache miss address and the list address.

In a further embodiment, the system may further comprise a counter device incrementing a value of the counter device in response to determining that there is no match between the current cache miss address and the list address.

In a further embodiment, the system may further comprise a first array storing a sequence of valid cache miss addresses.

In a further embodiment, the system may further comprise:

means for storing the current cache miss address in the first array; and a write module for writing contents of the first array to a memory device in response to determining that the first array is full.

BRIEF DESCRIPTION OF THE DRAWINGS

The accompanying drawings are included to provide a further understanding of the present invention, and are incorporated in and constitute a part of this specification.

DETAILED DESCRIPTION

In one embodiment, a parallel computing system operates at least an algorithm for prefetching data and/or instructions. According to the algorithm, with software (e.g., a compiler) cooperation, memory access patterns can be recorded and/or reused by at least one list prefetch engine (e.g., a software or hardware module prefetching data or instructions according to a list including a sequence of prior cache miss address(es)). In one embodiment, there are at least four list prefetch engines. A list prefetch engine allows iterative application software (e.g., "while" loop, etc.) to make an efficient use of general, but repetitive, memory access patterns. The recording of patterns of physical memory access by hardware (e.g., a list prefetch engine 100 in FIG. 1) enables virtual memory transactions to be ignored and recorded in terms of their corresponding physical memory addresses.

A list describes an arbitrary sequence (i.e., a sequence not necessarily arranged in an increasing, consecutive order) of prior cache miss addresses (i.e., addresses that caused cache misses before). In one embodiment, address lists which are recorded from L1 (level one) cache misses and later loaded and used to drive the list prefetch engine may include, for example, 29-bit, 128-byte addresses identifying L2 (level-two) cache lines in which an L1 cache miss occurred. Two additional bits are used to identify, for example, the 64-byte, L1 cache lines which were missed. In this embodiment, these 31 bits plus an unused bit compose the basic 4-byte record out of which these lists are composed.

Figure 1:
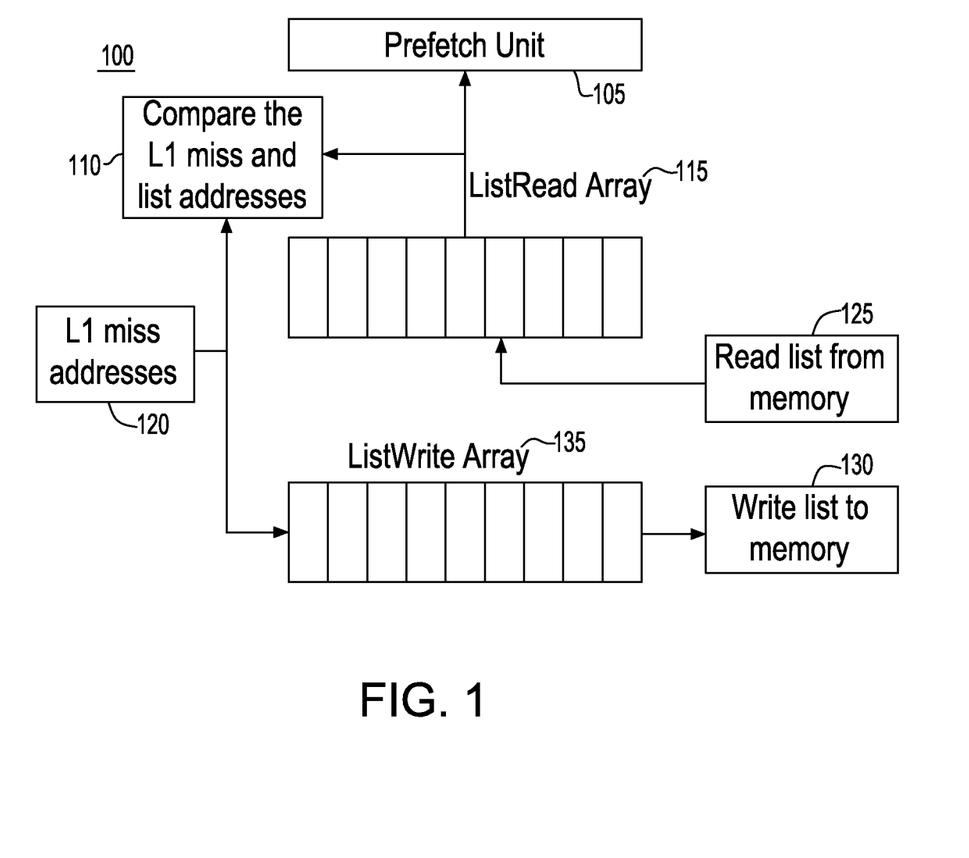
FIG. 1 illustrates a system diagram of a list prefetch engine in one embodiment.

FIG. 1 illustrates a system diagram of a list prefetch engine 100 in one embodiment. The list prefetch engine 100 includes, but is not limited to: a prefetch unit 105, a comparator 110, a first array referred to herein as "ListWrite array" 135, a second array referred to herein as "ListRead array" 115, a first module 120, a read module 125 and a write module 130. In one embodiment, there may be a plurality of list prefetch engines. A particular list prefetch engine operates on a single list at a time. A list ends with "EOL" (End of List). In a further embodiment, there may be provided a micro-controller (not shown) that requests a first segment (e.g., 64-byte segment) of a list from a memory device (not shown). This segment is stored in the ListRead array 115.

In one embodiment, a general approach to efficiently prefetching data being requested by a L1 (level-one) cache is to prefetch data and/or instructions following a memorized list of earlier access requests. Prefetching data according to a list works well for repetitive portions of code which do not contain data-dependent branches and which repeatedly make the same, possibly complex, pattern of memory accesses. Since this list prefetching (i.e., prefetching data whose addresses appear in a list) can be understood at an application level, a recording of such a list and its use in subsequent iterations may be initiated by compiler directives placed in code at strategic spots. For example, "start_list" (i.e., a directive for starting a list prefetch engine) and "stop_list" (i.e., a directive for stopping a list prefetch engine) directives may locate those strategic spots of the code where first memorizing, and then later prefetching, a list of L1 cache misses may be advantageous.

In one embodiment, a directive called start_list causes a processor core to issue a memory mapped command (e.g., input/output command) to the parallel computing system. The command may include, but not limited to:

A pointer to a location of a list in a memory device.
A maximum length of the list.
An address range described in the list. The address range pertains to appropriate memory accesses.
The number of a thread issuing the start_list directive. (For example, each thread can have its own list prefetch engine. Thus, the thread number can determine which list prefetch engine is being started. Each cache miss may also come with a thread number so the parallel computing system can tell which list prefetch engine is supposed to respond.)
TLB user bits and masks that identify the list.

The first module 120 receives a current cache miss address (i.e., an address which currently causes a cache miss) and evaluates whether the current cache miss address is valid. A valid cache miss address refers to a cache miss address belonging to a class of cache miss addresses for which a list prefetching is intended In one embodiment, the first module 120 evaluates whether the current cache miss address is valid or not, e.g., by checking a valid bit attached on the current cache miss address. The list prefetch engine 100 stores the current cache miss address in the ListWrite array 135 and/or the history FIFO. In one embodiment, the write module 130 writes the contents of the array 135 to a memory device when the array 135 becomes full. In another embodiment, as the ListWrite Array 135 is filled, e.g., by continuing L1 cache misses, the write module 130 continually writes the contents of the array 135 to a memory device and forms a new list that will be used on a next iteration (e.g., a second iteration of a "for" loop, etc.).

In one embodiment, the write module 130 stores the contents of the array 135 in a compressed form (e.g., collapsing a sequence of adjacent addresses into a start address and the number of addresses in the sequence) in a memory device (not shown). In one embodiment, the array 135 stores a cache miss address in each element of the array. In another embodiment, the array 135 stores a pointer pointing to a list of one or more addresses. In one embodiment, there is provided a software entity (not shown) for tracing a mapping between a list and a software routine (e.g., a function, loop, etc.). In one embodiment, cache miss addresses, which fall within an allowed address range, carry a proper pattern of translation lookaside buffer (TLB) user bits and are generated, e.g., by an appropriate thread. These cache miss addresses are stored sequentially in the ListWrite array 135.

In one embodiment, a processor core may allow for possible list miss-matches where a sequence of load commands deviates sufficiently from a stored list that the list prefetch engine 100 uses. Then, the list prefetch engine 100 abandons the stored list but continues to record an altered list for a later use.

In one embodiment, each list prefetch engine includes a history FIFO (not shown). This history FIFO can be implemented, e.g., by a 4-entry deep, 4 byte-wide set of latches, and can include at least four most recent L2 cache lines which appeared as L1 cache misses. This history FIFO can store L2 cache line addresses corresponding to prior L1 cache misses that happened most recently. When a new L1 cache miss, appropriate for a list prefetch engine, is determined as being valid, e.g., based on a valid bit associated with the new L1 cache miss, an address (e.g., 64-byte address) that caused the L1 cache miss is compared with the at least four addresses in the history FIFO. If there is a match between the L1 cache miss address and one of the at least four addresses, an appropriate bit in a corresponding address field (e.g., 32-bit address field) is set to indicate the half portion of the L2 cache line that was missed, e.g., the 64-byte portion of the 128-byte cache line was missed. If a next L1 cache miss address matches none of the at least four addresses in the history FIFO, an address at a head of the history FIFO is written out, e.g., to the ListWrite array 135, and this next address is added to a tail of the history FIFO.

When an address is removed from one entry of the history FIFO, it is written into the ListWrite array 135. In one embodiment, this ListWrite array 135 is an array, e.g., 8-deep, 16-byte wide array, which is used by all or some of list prefetch engines. An arbiter (not shown) assigns a specific entry (e.g., a 16-byte entry in the history FIFO) to a specific list prefetch engine. When this specific entry is full, it is scheduled to be written to memory and a new entry assigned to the specific list prefetch engine.

The depth of this ListWrite array 135 may be sufficient to allow for a time period for which a memory device takes to respond to this writing request (i.e., a request to write an address in an entry in the history FIFO to the ListWrite array 135), providing sufficient additional space that a continued stream of L1 cache miss addresses will not overflow this ListWrite array 135. In one embodiment, if 20 clock cycles are required for a 16-byte word of the list to be accepted to the history FIFO and addresses can be provided at the rate at which L2 cache data is being supplied (one L1 cache miss corresponds to 128 bytes of data loaded in 8 clock cycles), then the parallel computing system may need to have a space to hold 20/8≈3 addresses or an additional 12 bytes. According to this embodiment, the ListWrite array 135 may be composed of at least four, 4-byte wide and 3-word deep register arrays. Thus, in this embodiment, a depth of 8 may be adequate for the ListWrite array 135 to support a combination of at least four list prefetch engines with various degrees of activity. In one embodiment, the ListWrite array 135 stores a sequence of valid cache miss addresses.

The list prefetch engine 100 stores the current cache miss address in the array 135. The list prefetch engine 100 also provides the current cache miss address to the comparator 110. In one embodiment, the engine 100 provides the current miss address to the comparator 110 when it stores the current miss address in the array 135. In one embodiment, the comparator 110 compares the current cache miss address and a list address (i.e., an address in a list; e.g., an element in the array 135). If the comparator 110 does not find a match between the current miss address and the list address, the comparator 110 compares the current cache miss address with the next list addresses (e.g., the next eight addresses listed in a list; the next eight elements in the array 135) held in the ListRead Array 115 and selects the earliest matching address in these addresses (i.e., the list address and the next list addresses). The earliest matching address refers to a prior cache miss address whose index in the array 115 is the smallest and which matches with the current cache miss address. An ability to match a next address in the list with the current cache miss address is a fault tolerant feature permitting addresses in the list which do not reoccur as L1 cache misses in a current running of a loop to be skipped over.

In one embodiment, the comparator 110 compares addresses in the list and the current cache miss address in an order. For example, the comparator 110 compares the current cache miss address and the first address in the list. Then, the comparator may compare the current cache miss address and the second address in the list. In one embodiment, the comparator 110 synchronizes an address in the list which the comparator 110 matches with the current cache miss address with later addresses in the list for which data is being prefetched. For example, the list prefetch engine 100 finds a match between a second element in the array 115, then the list prefetch engine 100 prefetches data whose addresses are stored in the second element and subsequent elements of the array 115. This separation between the address in the list which matches the current cache miss address and the address in the list being prefetched is called the prefetch depth and in one embodiment this depth can be set, e.g., by software (e.g., a compiler). In one embodiment, the comparator 110 includes a fault-tolerant feature. For example, when the comparator 110 detects a valid cache miss address that does not match any list address with which it is compared, that cache miss address is dropped and the comparator 110 waits for next valid address. In another embodiment, a series of mismatches between the cache miss address and the list address (i.e., addresses in a list) may cause the list prefetch engine to be aborted. However, a construction of a new list in the ListWrite array 135 will continue. In one embodiment, loads (i.e., load commands) from a processor core may be stalled until a list has been read from a memory device and the list prefetch engine 100 is ready to compare (110) subsequent L1 cache misses with at least or at most eight addresses of the list.

In one embodiment, lists needed for a comparison (110) by at least four list prefetch engines are loaded (under a command of individual list prefetch engines) into a register array, e.g., an array of 24 depth and 16-bytes width. These registers are loaded according to a clock frequency with data coming from the memory (not shown). Thus, each list prefetch engine can access at least 24 four-byte list entries from this register array. In one embodiment, a list prefetch engine may load these list entries into its own set of, for example, 8, 4-byte comparison latches. L1 cache miss addresses issued by a processor core can then be compared with addresses (e.g., at least or at most eight addresses) in the list. In this embodiment, when a list prefetch engine consumes 16 of the at least 24 four-byte addresses and issues a load request for data (e.g., the next 64-byte data in the list), a reservoir of the 8, 4-byte addresses may remain, permitting a single skip-by-eight (i.e., skipping eight 4-byte addresses) and subsequent reload of the 8, 4-byte comparison latches without requiring a stall of the processor core.

In one embodiment, L1 cache misses associated with a single thread may require data to be prefetched at a bandwidth of the memory system, e.g., one 32-byte word every two clock cycles. In one embodiment, if the parallel computing system requires, for example, 100 clock cycles for a read command to the memory system to produce valid data, the ListRead array 115 may have sufficient storage so that 100 clock cycles can pass between an availability of space to store data in the ListRead array 115 and a consumption of the remaining addresses in the list. In this embodiment, in order to conserve area in the ListReady array 115, only 64-byte segments of the list may be requested by the list prefetch engine 100. Since each L1 cache miss leads to a fetching of data (e.g., 128-byte data), the parallel computing system may consume addresses in an active list at a rate of one address every particular clock cycles (e.g., 8 clock cycles). Recognizing a size of an address, e.g., as 4 bytes, the parallel computing system may calculate that a particular lag (e.g., 100 clock cycle lag) between a request and data in the list may require, for example, 100/8*4 or a reserve of 50 bytes to be provided in the ListRead array 115. Thus, a total storage provided in the ListRead array 115 may be, for example, 50+64≈114 bytes. Then, a total storage (e.g., 32+96=128 bytes) of the ListRead array 115 may be close to a maximum requirement.

The prefetch unit 105 prefetches data and/or instruction(s) according to a list if the comparator 110 finds a match between the current cache miss address and an address on the list. The prefetch unit 105 may prefetch all or some of the data stored in addresses in the list. In one embodiment, the prefetch unit 105 prefetches data and/or instruction(s) up to a programmable depth (i.e., a particular number of instructions or particular amount of data to be prefetched; this particular number or particular amount can be programmed, e.g., by software).

In one embodiment, addresses held in the comparator 110 determine prefetch addresses which occur later in the list and which are sent to the prefetch unit 105 (with an appropriate arbitration between the at least four list prefetch engines). Those addresses (which have not yet been matched) are sent off for prefetching up to a programmable prefetch depth (e.g., a depth of 8). If an address matching (e.g., an address comparison between an L1 cache miss address and an address in a list) proceeds with a sufficient speed that a list address not yet prefetched matches the L1 cache miss address, this list address may trigger a demand to load data in the list address and no prefetch of the data is required. Instead, a demand load of the data to be returned directly to a processor core may be issued. The address matching may be done in parallel or in sequential, e.g., by the comparator 110.

In one embodiment, the parallel computing system can estimate the largest prefetch depth that might be needed to ensure that prefetched data will be available when a corresponding address in the list turns up as an L1 cache miss address (i.e., an address that caused an L1 cache miss). Assuming that a single thread running in a processor core is consuming data as fast as the memory system can provide to it (e.g., a new 128-byte prefetch operation every 8 clock cycles) and that a prefetch request requires, for example, 100 clock cycles to be processed, the parallel computing system may need to have, for example, 100/8≈12 prefetch active commands; that is, a depth of 12, which may be reasonably close to the largest available depth (e.g., a depth of 8).

In one embodiment, the read module 125 stores a pointer pointing to a list including addresses whose data may be prefetched in each element. The ListRead array 115 stores an address whose data may be prefetched in each element. The read module 125 loads a plurality of list elements from a memory device to the ListRead array 115. A list loaded by the read module 125 includes, but is not limited to: a new list (i.e., a list that is newly created by the list prefetch engine 100), an old list (i.e., a list that has been used by the list prefetch engine 100). Contents of the ListRead array 115 are presented as prefetch addresses to a prefetch unit 105 to be prefetched. This presence may continue until a pre-determined or post-determined prefetching depth is reached. In one embodiment, the list prefetch engine 100 may discard a list whose data has been prefetched. In one embodiment, a processor (not shown) may stall until the ListRead array 115 is fully or partially filled.

In one embodiment, there is provided a counter device in the prefetching control (not shown) which counts the number of elements in the ListRead array 115 between that most recently matched by the comparator 110 and the latest address sent to the prefetch unit 105. As a value of the counter device decrements, i.e., the number of matches increments, while the matching operates with the ListRead array 115, prefetching from later addresses in the ListRead array 115 may be initiated to maintain a preset prefetching depth for the list.

In one embodiment, the list prefetch engine 100 may be implemented in hardware or reconfigurable hardware, e.g., FPGA (Field Programmable Gate Array) or CPLD (Complex Programmable Logic Device), using a hardware description language (Verilog, VHDL, Handel-C, or System C). In another embodiment, the list prefetch engine 100 may be implemented in a semiconductor chip, e.g., ASIC (Application-Specific Integrated Circuit), using a semi-custom design methodology, i.e., designing a chip using standard cells and a hardware description language. In one embodiment, the list prefetch engine 100 may be implemented in a processor (e.g., IBM® PowerPC® processor, etc.) as a hardware unit(s). In another embodiment, the list prefetch engine 100 may be implemented in software (e.g., a compiler or operating system), e.g., by a programming language (e.g., Java®, C/C++, .Net, Assembly language(s), Pearl, etc.).

Figure 2:
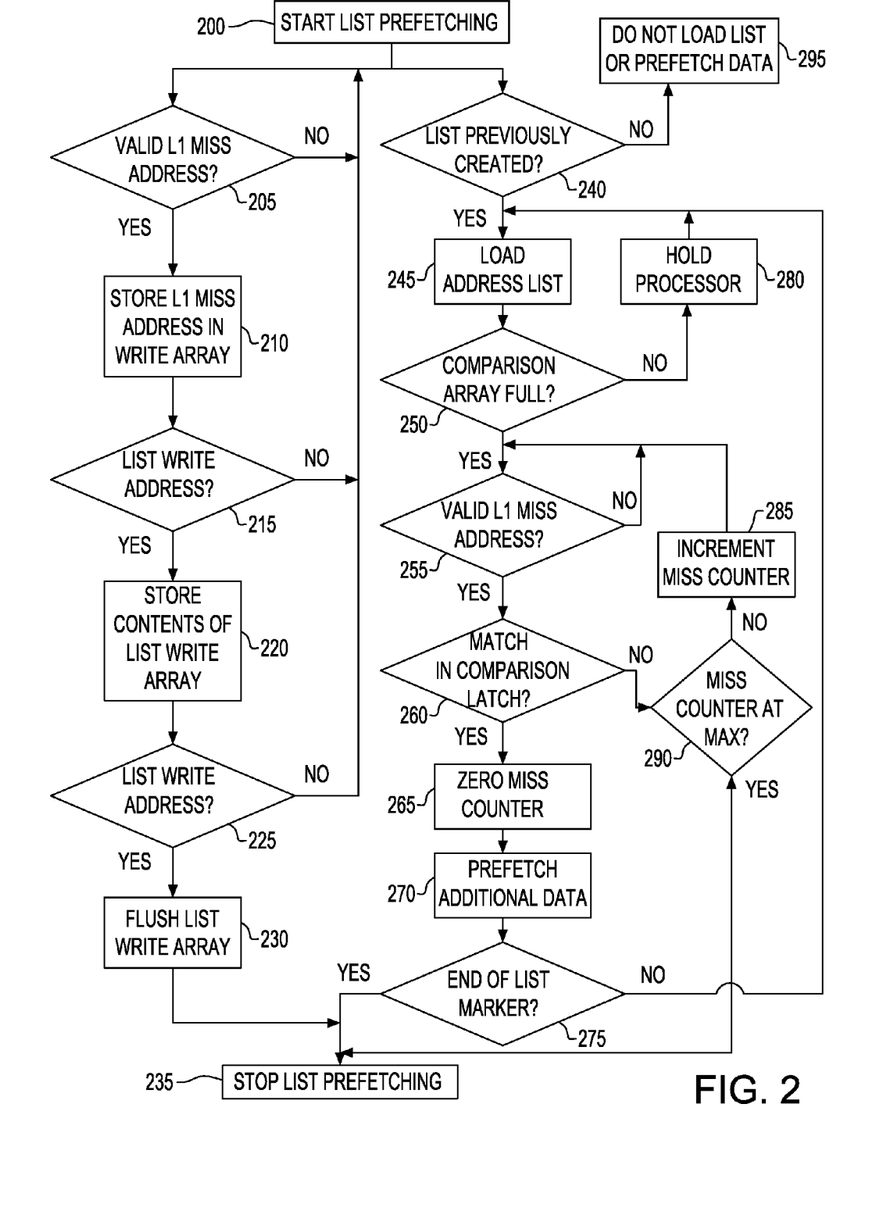
FIG. 2 illustrates a flow chart illustrating method steps performed by the list prefetch engine in one embodiment.

FIG. 2 illustrates a flow chart illustrating method steps performed by the list prefetch engine 100 in one embodiment. At step 200, a parallel computing system operates at least one list prefetch engine (e.g., a list prefetch engine 100). At step 205, a list prefetch engine 100 receives a cache miss address and evaluates whether the cache miss address is valid or not, e.g., by checking a valid bit of the cache miss address. If the cache miss address is not valid, the control goes to step 205 to receive a next cache miss address. Otherwise, at step 210, the list prefetch engine 100 stores the cache miss address in the ListWrite array 135.

At step 215, the list prefetch engine evaluates whether the ListWrite array 135 is full or not, e.g., by checking an empty bit (i.e., a bit indicating that a corresponding slot is available) of each slot of the array 135. If the ListWrite array 135 is not full, the control goes to step 205 to receive a next cache miss address. Otherwise, at step 220, the list prefetch engine stores contents of the array 135 in a memory device.

At step 225, the parallel computing system evaluates whether the list prefetch engine needs to stop. Such a command to stop would be issued when running list control software (not shown) issues a stop list command (i.e., a command for stopping the list prefetch engine 100). If such a stop command has not been issued, the control goes to step 205 to receive a next cache miss address. Otherwise, at step 230, the prefetch engine flushes contents of the ListWrite array 135. This flushing may set empty bits (e.g., a bit indicating that an element in an array is available to store a new value) of elements in the ListWrite array 135 to high ("1") to indicate that those elements are available to store new values. Then, at step 235, the parallel computing system stops this list prefetch engine (i.e., a prefetch engine performing the steps 200-230).

While operating steps 205-230, the prefetch engine 100 may concurrently operate steps 240-290. At step 240, the list prefetch engine 100 determines whether the current list has been created by a previous use of a list prefetch engine or some other means. In one embodiment, this is determined by a "load list" command bit set by software when the list engine prefetch 200 is started. If this "load list" command bit is not set to high ("1"), then no list is loaded to the ListRead array 115 and the list prefetch engine 100 only records a list of the L1 cache misses to the history FIFO or the ListWrite array 135 and does no prefetching.

If the list assigned to this list prefetch engine 100 has not been created, the control goes to step 295 to not load a list into the ListRead array 115 and to not prefetch data. If the list has been created, e.g., a list prefetch engine or other means, the control goes to step 245. At step 245, the read module 125 begins to load the list from a memory system.

At step 250, a state of the ListRead array 115 is checked. If the ListRead array 115 is full, then the control goes to step 255 for an analysis of the next cache miss address. If the ListRead array 115 is not full, a corresponding processor core is held at step 280 and the read module 125 continues loading prior cache miss addresses into the ListRead array 115 at step 245.

At step 255, the list prefetch engine evaluates whether the received cache miss address is valid, e.g., by checking a valid bit of the cache miss address. If the cache miss address is not valid, the control repeats the step 255 to receive a next cache miss address and to evaluate whether the next cache miss address is valid. A valid cache miss address refers to a cache miss address belonging to a class of cache miss addresses for which a list prefetching is intended Otherwise, at step 260, the comparator 110 compares the valid cache miss address and address(es) in list in the ListRead array 115. In one embodiment, the ListRead array 115 stores a list of prior cache miss addresses. If the comparator 110 finds a match between the valid cache miss address and an address in a list in the ListRead array, at step 265, the list prefetch engine resets a value of a counter device which counts the number of mismatches between the valid cache miss address and addresses in list(s) in the ListRead array 115.

Otherwise, at step 290, the list prefetch engine compares the value of the counter device to a threshold value. If the value of the counter device is greater than the threshold value, the control goes to step 290 to let the parallel computing system stop the list prefetch engine 100. Otherwise, at step 285, the list prefetch engine 100 increments the value of the counter device and the control goes back to the step 255.

At step 270, the list prefetch engine prefetches data whose addresses are described in the list which included the matched address. The list prefetch engine prefetches data stored in all or some of the addresses in the list. The prefetched data whose addresses may be described later in the list, e.g., subsequently following the match address. At step 275, the list prefetch engine evaluates whether the list prefetch engine reaches "EOL" (End of List) of the list. In other words, the list prefetch engine 100 evaluates whether the prefetch engine 100 has prefetched all the data whose addresses are listed in the list. If the prefetch engine does not reach the "EOL," the control goes back to step 245 to load addresses (in the list) whose data have not been prefetched yet into the ListRead array 115. Otherwise, the control goes to step 235. At step 235, the parallel computing system stops operating the list prefetch engine 100.

In one embodiment, the parallel computing system allows the list prefetch engine to memorize an arbitrary sequence of prior cache miss addresses for one iteration of programming code and subsequently exploit these addresses by prefetching data stored in this sequence of addresses. This data prefetching is synchronized with an appearance of earlier cache miss addresses during a next iteration of the programming code.

In a further embodiment, the method illustrated in FIG. 2 may be extended to include the following variations when implementing the method steps in FIG. 2:

The list prefetch engine can prefetch data through a use of a sliding window (e.g., a fixed number of elements in the ListRead array 135) that tracks the latest cache miss addresses thereby allowing to prefetch data stored in a fixed number of cache miss addresses in the sliding window. This usage of the sliding window achieves a maximum performance, e.g., by efficiently utilizing a prefetch buffer which is a scarce resource. The sliding window also provides a degree of tolerance in that a match in the list is not necessary as long as the next L1 cache miss address is within a range of a width of the sliding window.

A list of addresses can be stored in a memory device in a compressed form to reduce an amount of storage needed by the list.

Lists are indexed and can be explicitly controlled by software (user or compiler) to be invoked.

Lists can optionally be simultaneously saved while a current list is being utilized for prefetching. This feature allows an additional tolerance to actual memory references, e.g., by effectively refreshing at least one list on each invocation.

Lists can be paused through software to avoid loading a sequence of addresses that are known not relevant (e.g., the sequence of addresses are unlikely be re-accessed by a processor unit). For example, data dependent branches such as occur during a table lookup may be carried out while list prefetching is paused.

In one embodiment, prefetching initiated by an address in a list is for a full L2 (Level-two) cache line. In one embodiment, the size of the list may be minimized or optimized by including only a single 64-byte address which lies in a given 128-byte cache line. In this embodiment, this optimization is accomplished, e.g., by comparing each L1 cache miss with previous four L1 cache misses and adding a L1 cache miss address to a list only if it identifies a 128-byte cache line different from those previous four addresses. In this embodiment, in order to enhance a usage of the prefetch data array, a list may identify, in addition to an address of the 128-byte cache line to be prefetched, those 64-byte portions of the 128-byte cache line which corresponded to L1 cache misses. This identification may allow prefetched data to be marked as available for replacement as soon as portions of the prefetched data that will be needed have been hit.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which when loaded in a computer system is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention. The present invention may also include a computer program product for one or more functions of this invention. The computer program product includes a storage medium (e.g., a disk, optical disc, memory device, solid-state drive, etc.) readable by a processing circuit and storing instructions run by the processing circuit for performing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for increasing performance in a parallel computing system, the method comprising:
   receiving a current cache miss address, a cache miss address representing an address that caused a cache miss;
   evaluating whether the current cache miss address is valid, a valid cache miss address referring to a cache miss address belonging to a class of cache miss addresses for which a prefetching is intended;
   comparing the cache miss address and a list address in response to determining that the current cache miss address is valid, the list address representing an address in a list, the list describing prior cache miss addresses; and
   prefetching data whose addresses appear in the list in response to determining that there is a match between the current cache miss address and a list address;
   said comparing including steps of:
      identifying a processing thread that initiates said data prefetching according to said list;
   said prefetching including steps of:
      executing a first directive in the processing thread, the executing of the first directive starting said data prefetching according to said list;
      executing a second directive in the processing thread, the executing of the second directive stopping said data prefetching.

2. The method according to claim 1, further comprising:
   incrementing a counter device in response to determining that there is no match between the current cache miss address and the list address.

3. The method according to claim 2, further comprising:
   comparing a value of the counter device to a threshold value; and
   stopping a corresponding prefetching of data in response to determining that the value of the counter device exceeds the threshold value.

4. The method according to claim 2, further comprising:
   resetting the counter device in response to determining that there is the match.

5. The method according to claim 1, further comprising:
   providing a first array storing a sequence of valid cache miss addresses.

6. The method according to claim 5, further comprising:
   storing the current cache miss address in the first array; and
   writing contents of the first array to a memory device in response to determining that the first array is full.

7. The method according to claim 6, wherein the writing includes:
   storing the contents in the memory device in a compressed form.

8. The method according to claim 7, further comprising:
   evaluating whether a prefetching needs to be stopped after the storing the contents.

9. The method according to claim 8, further comprising:
   flushing the contents in the first array in response to determining that the prefetching needs to be stopped.

10. The method according to claim 1, further comprising:
    loading prior cache miss addresses from a memory device to a second array.

11. The method according to claim 1, wherein the prefetching includes:
    fetching data through a use of a sliding window, the sliding window allowing prefetching data stored in a fixed number of cache miss addresses.

12. The method according to claim 1, further comprising:
    identifying a plurality of other processing threads that include the first directive;
    executing the first directive in each of the other processing threads, wherein the executing the each of the other processing threads initiates each different prefetching of data according to each different list of prior cache miss addresses.

13. A system for increasing performance in a parallel computing system, the system comprising:
    a first module for receiving a current cache miss address, a cache miss address representing an address that caused a cache miss and evaluating whether the current cache miss address is valid, a valid cache miss address referring to a cache miss address belonging to a class of cache miss addresses for which a list prefetching is intended;
    a first comparator for comparing the current cache miss address and a list address in response to determining that the current cache miss address is valid, the list address representing an address in a list, the list describing an arbitrary sequence of prior cache miss addresses;
    a prefetch unit prefetching data whose addresses appear in the list in response to determining that there is a match between the current cache miss address and the list address;
    the first comparator for identifying a thread that initiates the data prefetching according to the list;
    at least one processor executing a first directive in the processing thread, the executing of the first directive starting said data prefetching according to said list; and
    the at least one processor executing a second directive in the processing thread, the executing of the second directive stopping said data prefetching.

14. The system according to claim 13, further comprising:
    a counter device incrementing a value of the counter device in response to determining that there is no match between the current cache miss address and the list address.

15. The system according to claim 14, further comprising:
    a second comparator comparing a value of the counter device to a threshold value; and
    the compiler for stopping the prefetching in response to determining that the value of the counter device exceeds the threshold value.

16. The system according to claim 15, further comprising:
    the prefetch unit for resetting the counter device in response to determining that there is the match.

17. The system according to claim 13, further comprising:
    a first array storing a sequence of valid cache miss addresses.

18. The system according to claim 17, further comprising:
the prefetch unit for storing the current cache miss address in the first array; and
a write module for writing contents of the first array to a memory device in response to determining that the first array is full.

19. The system according to claim 18, wherein the write module stores the contents in the memory device in a compressed form.

20. The system according to claim 19, further comprising:
the parallel computing system for evaluating whether the prefetching needs to be stopped after the storing the contents.

21. The system according to claim 20, further comprising:
the prefetch unit for flushing the contents in the first array in response to determining that the prefetching needs to be stopped.

22. The system according to claim 13, wherein the first module loads prior cache miss addresses from a memory device to a second array.

23. The method according to claim 13, wherein the prefetch unit further includes:
the prefetch unit for fetching data through a use of a sliding window, the sliding window allowing prefetching data stored in a fixed number of cache miss addresses.

24. A non-transitory computer program product for increasing performance in a parallel computing system, the computer program product comprising a non-transitory storage medium readable by a processing circuit and storing instructions run by the processing circuit for performing a method according to claim 1.

* * * * *